(12) United States Patent
Duenas et al.

(10) Patent No.: US 10,805,635 B1
(45) Date of Patent: Oct. 13, 2020

(54) APPARATUS AND METHOD FOR CODING TREE UNIT BIT SIZE LIMIT MANAGEMENT

(71) Applicant: NGCodec Inc., Sunnyvale, CA (US)

(72) Inventors: Alberto Duenas, Mountain View, CA (US); Frank Bossen, Ontario (CA)

(73) Assignee: NGCodec Inc., San Jose, CA (US)

( * ) Notice: Subject to any disclaimer, the term of this patent is extended or adjusted under 35 U.S.C. 154(b) by 90 days.

(21) Appl. No.: 15/466,848

(22) Filed: Mar. 22, 2017

Related U.S. Application Data

(60) Provisional application No. 62/311,756, filed on Mar. 22, 2016.

(51) Int. Cl.
| | | |
|---|---|---|
| *H04N 19/513* | (2014.01) | |
| *H04N 19/57* | (2014.01) | |
| *H04N 19/196* | (2014.01) | |
| *H04N 19/48* | (2014.01) | |
| *H04N 19/543* | (2014.01) | |
| *H04N 5/91* | (2006.01) | |
| *G06T 7/20* | (2017.01) | |
| *G06T 7/194* | (2017.01) | |
| *G06K 9/00* | (2006.01) | |
| *H04N 19/593* | (2014.01) | |
| *H04N 19/176* | (2014.01) | |

(52) U.S. Cl.
CPC ......... *H04N 19/593* (2014.11); *H04N 19/176* (2014.11)

(58) Field of Classification Search
None
See application file for complete search history.

(56) References Cited

U.S. PATENT DOCUMENTS

| | | | | |
|---|---|---|---|---|
| 6,493,390 B2 * | 12/2002 | Miyaji | ........... | H04N 19/176 375/240.16 |
| 2002/0012395 A1 * | 1/2002 | Song | ........... | H04N 19/197 375/240.03 |
| 2002/0186767 A1 * | 12/2002 | Kawashima | ..... | H04N 21/23406 375/240.03 |
| 2004/0202247 A1 * | 10/2004 | Chang | ........... | H04N 19/172 375/240.03 |
| 2005/0025370 A1 * | 2/2005 | Koshiba | ........... | H04N 19/149 382/239 |
| 2007/0153892 A1 * | 7/2007 | Yin | ........... | H04N 19/15 375/240.03 |
| 2007/0294245 A1 * | 12/2007 | van Baarsen | ........ | H04N 19/176 |
| 2008/0310505 A1 * | 12/2008 | Yan | ........... | H04N 7/52 375/240.03 |
| 2011/0051801 A1 * | 3/2011 | Hwang | ........... | H04N 19/176 375/240.02 |
| 2011/0090960 A1 * | 4/2011 | Leontaris | ........... | H04N 19/103 375/240.12 |

(Continued)

OTHER PUBLICATIONS

Ip.Com search report.*

*Primary Examiner* — Mohammad J Rahman
(74) *Attorney, Agent, or Firm* — Cooley LLP

(57) ABSTRACT

A hardware encoder has a bit estimation block to compute an estimated bit size for a Coding Tree Unit (CTU). A CTU bit size limit manager selects quantization parameters for use in quantization. The quantization parameters are selected based upon the estimated bit size to insure that the CTU in coded form will not exceed a CTU bit size limit.

9 Claims, 3 Drawing Sheets

(56) References Cited

U.S. PATENT DOCUMENTS

| | | | |
|---|---|---|---|
| 2012/0163453 A1* | 6/2012 | Horowitz | H04N 19/137 375/240.12 |
| 2012/0237133 A1* | 9/2012 | Jeong | H04N 19/176 382/236 |
| 2013/0301699 A1* | 11/2013 | Pearson | H04N 19/15 375/240.02 |
| 2014/0079135 A1* | 3/2014 | Van der Auwera | H04N 19/70 375/240.18 |
| 2014/0105302 A1* | 4/2014 | Takehara | H04N 19/176 375/240.15 |
| 2015/0016533 A1* | 1/2015 | Pang | H04N 19/51 375/240.16 |
| 2015/0103883 A1* | 4/2015 | Wu | H04N 19/119 375/240.02 |
| 2015/0237345 A1* | 8/2015 | Chono | H04N 19/105 377/240.02 |
| 2015/0271510 A1* | 9/2015 | Wen | H04N 19/40 375/240.02 |
| 2015/0281705 A1* | 10/2015 | Wang | H04N 19/1883 375/240.03 |
| 2016/0014421 A1* | 1/2016 | Cote | H04N 19/196 382/170 |
| 2016/0014434 A1* | 1/2016 | Liu | H04N 19/176 375/240.12 |
| 2016/0227241 A1* | 8/2016 | Franche | H04N 19/52 |
| 2016/0241854 A1* | 8/2016 | Cheng | H04N 19/91 |
| 2016/0241858 A1* | 8/2016 | Li | H04N 19/159 |
| 2016/0330445 A1* | 11/2016 | Ugur | H04N 19/11 |
| 2017/0006287 A1* | 1/2017 | Subramanya | H04N 19/124 |
| 2018/0041757 A1* | 2/2018 | Liu | H04N 19/593 |
| 2018/0048895 A1* | 2/2018 | Jeon | H04N 19/159 |

\* cited by examiner

APPARATUS AND METHOD FOR CODING TREE UNIT BIT SIZE LIMIT MANAGEMENT

CROSS REFERENCE TO RELATED APPLICATIONS

This application claims priority to U.S. patent provisional application No. 62/311,756 filed on Mar. 22, 2016, the contents of which are incorporated herein by reference.

FIELD OF THE INVENTION

This invention relates generally to hardware based video signal processing. More particularly, this invention relates to techniques for coding tree unit bit size limit management.

BACKGROUND OF THE INVENTION

High Efficiency Video Coding (HEVC) is a video compression standard. In HEVC, the basic processing unit is called a coding tree unit (CTU) and it can be as large as 64×64 luma samples. A CTU can be split into multiple coding units (CU) in a quadtree fashion; these CUs can have sizes varying from 8×8 to 64×64. Each CU can be coded either as an intra-picture prediction (INTRA) CU or as an inter-picture prediction (INTER) CU. Thus, the CU is the basic unit for forming the prediction.

HEVC and previously Advanced Video Coding (AVC) define the maximum size that an encoder may use for the coding of a CTU (a macroblock in the case of AVC). The coding schema may produce an excessive bit count. In such cases, the raw uncompressed data may be used instead of the compressed data.

The HEVC specification constrains the maximum number of bits per CTU. It is possible that a CTU can be expanded by up to 7.4× in complex cases without this constrain. Although such an expansion is unlikely, an HEVC decoder should be able to accommodate it. Therefore, a constraint on the number of bits per CTU is introduced to reduce the burden on decoder implementation. HEVC allows for the size of a given CTU to be 5/3 of the uncompressed data.

It is important to avoid a situation in which one uses a very low quantization parameter (QP) to be able to deliver a very high fidelity for a first image portion that is followed by a second image portion having a high entropy that is difficult to predict and that could therefore potentially lead to a number of bits for that CTU that is larger than the limits defined by HEVC.

Having to guarantee that the size of a CTU (or MB) is a challenge that it is imposed on the encoder and leads to having to count the number of bits being used on the encoding process to avoid exceeding such a limit and break the constraints imposed by the standard. The prior art normally addresses this problem by encoding a CTU, counting the bits and if the bit count exceeds the limitation imposed by the specification, the CTU is re-encoded with a higher QP until the number of bits produced is lower than the limit. Re-encoding CTUs is a very costly process that should be avoided.

Accordingly, there is a need for improved bit size limit management in a hardware encoder.

SUMMARY OF THE INVENTION

A hardware encoder has a bit estimation block to compute an estimated bit size for a Coding Tree Unit (CTU). A CTU bit size limit manager selects quantization parameters for use in quantization. The quantization parameters are selected based upon the estimated bit size to insure that the CTU in coded form will not exceed a CTU bit size limit.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
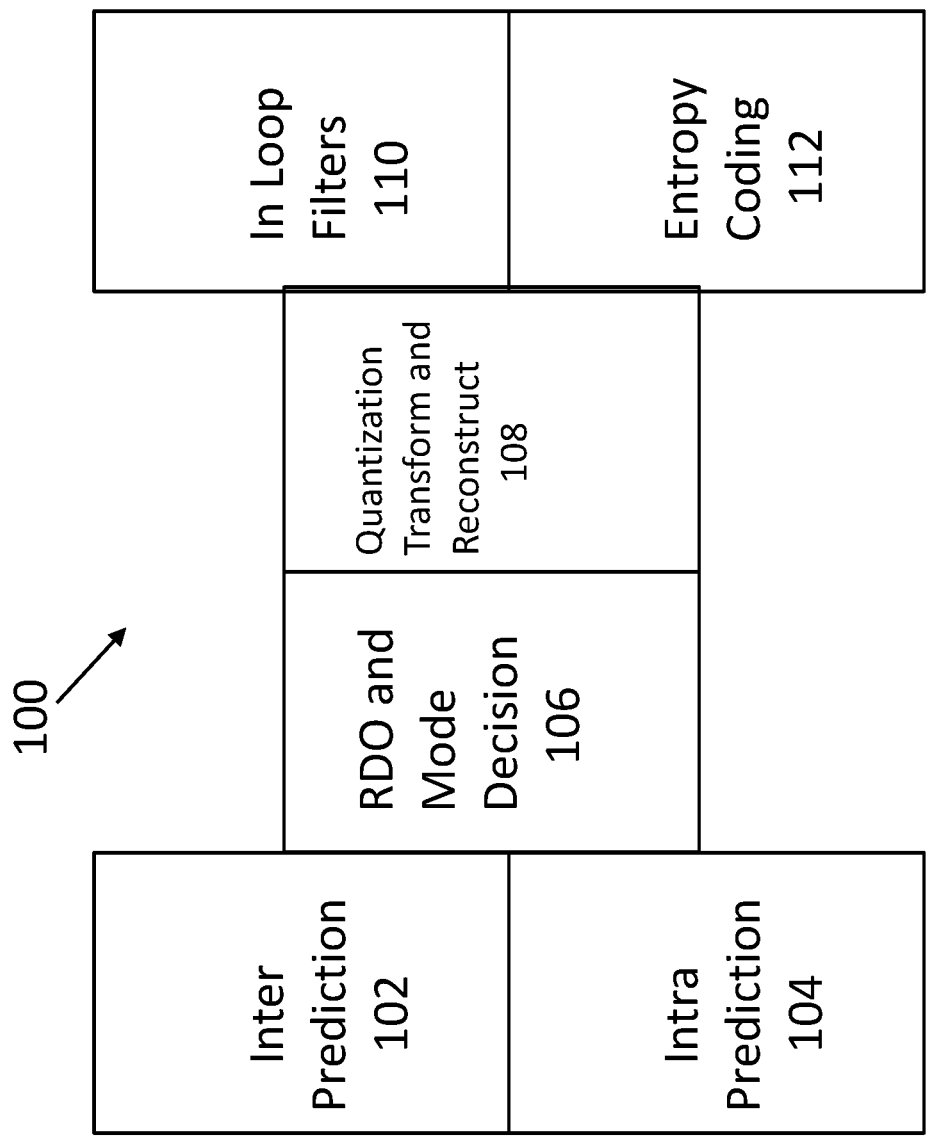
FIG. 1 illustrates generic stages of an encoder.

FIG. 1 illustrates an architecture 100 for an encoder. Inter prediction block 102 executes a prediction search mechanism to predict the information of the current image from the information available from a future image and a past image. The intra prediction block 104 executes a prediction search mechanism from the information available within a current image. Inter prediction block 102 and intra prediction block 104 are vertically aligned to denote that they may operate in parallel. Blocks 102 and 104 generate lists of candidates to be considered by mode decision block 106. Each candidate may be represented by a motion vector in the case of inter prediction or an intra prediction mode index in the case of intra prediction. A rate estimate and a distortion estimate are generated for each candidate.

The RDO and mode decision block 106 selects a CTU candidate from all available CTU candidates. In particular, the encoder selects which way inter and intra prediction are combined and what block size to be used for the coding. Efficient encoders rely on rate-distortion metrics to make decisions such as block size determination. Given a number of choices for a block size, an encoder estimates rate and distortion for each choice. The rate is generally expressed as a number of bits needed to encode the choice. The distortion can be expressed as a sum of squared differences between a block to be coded and its reconstructed version after compression. While it is possible to compute exact numbers when estimating rate and distortion, such an approach is impractical in most scenarios, in particular for real-time encoders. This impracticality stems from the high computational complexity required to compute the estimates. In practice, computationally efficient approximations are used. A rate estimate R and a distortion estimate D are typically combined into a single rate-distortion cost estimate C using a linear combination such as λR+D where λ is a weighting factor called a Lagrange multiplier. This weighting factor reflects the desired balance between rate and distortion and may be adjusted according to a target bit rate. Once costs are determined for each of the choices available to the encoder, the one with the lowest cost is picked. This process is commonly referred to as rate-distortion optimization (RDO).

Block 108 performs Quantization, Transform and Reconstruct operations. The in loop filters block 110 are part of the coding process. The loop filters try to reduce the distortion introduced by the encoding process. The entropy coding block 112 tries to extract the mathematical redundancy that may still exist in the data before it is transmitted to the decoder. Blocks 110 and 112 perform operations in parallel.

The encoder 100 is based on a pipelined hardware design. Most of the processing of the video signals is performed by dedicated hardware blocks that are optimized for the associated task. Each block of the encoder 100 constitutes a pipeline stage.

Each pipeline stage processes one complete CTU before sending it to the next pipeline stage. Pipeline stages that are vertically aligned in FIG. 1 are operating in parallel. In the case of running all pipeline stages in parallel at 200 MHz, 6400 clock cycles are available for each pipeline stage to process one CTU when encoding a 1080p video sequence featuring 60 frames per second. The signal processing pipeline stages are synchronous, each stage using the 6400 clock cycles to process the CTU, although for power saving purposes the stage may be largely shut down for many of those cycles, if the work on a given CTU is finished early.

Figure 2:
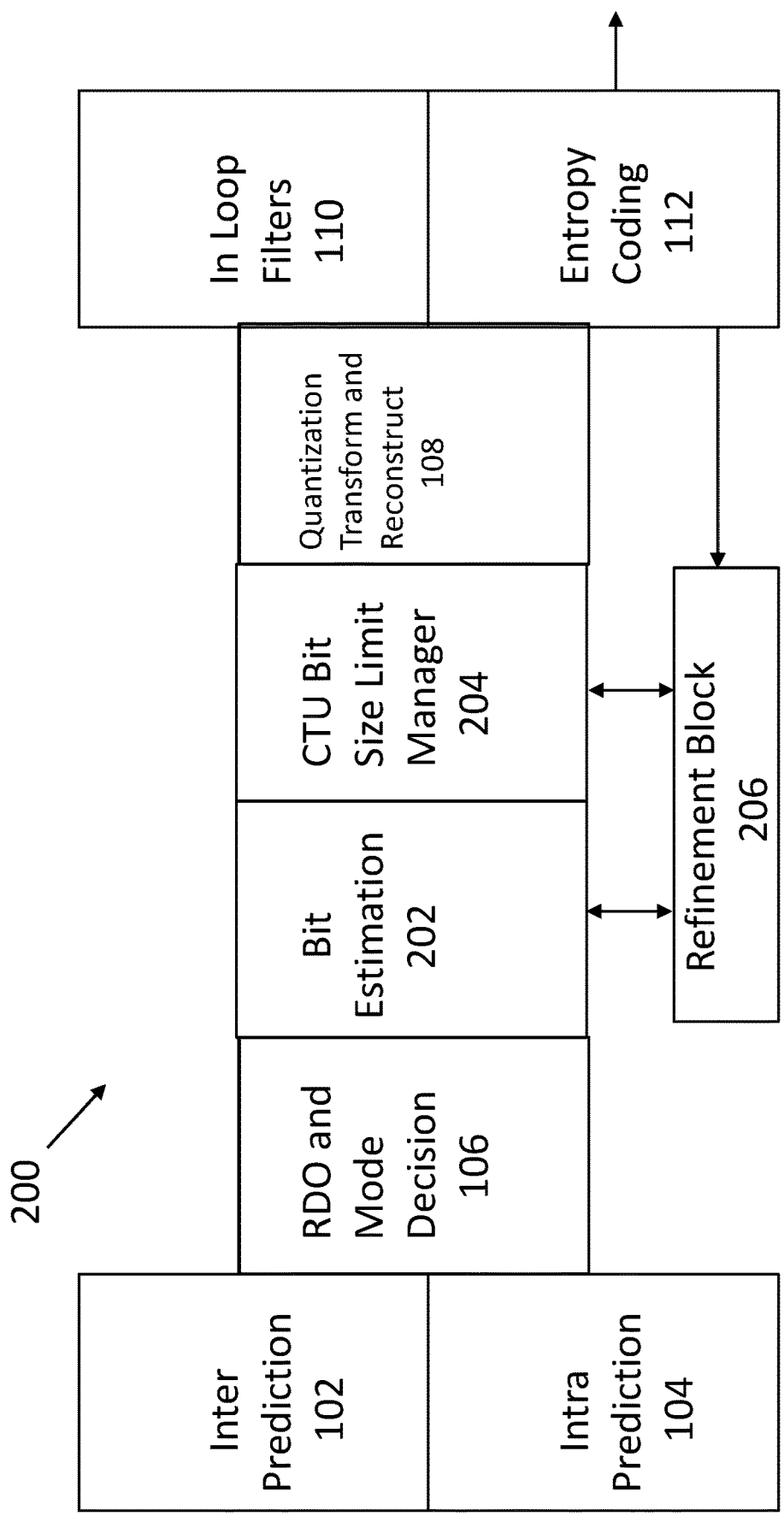
FIG. 2 illustrates an encoder configured in accordance with an embodiment of the invention.

FIG. 2 illustrates an encoder 200 configured in accordance with an embodiment of the invention. The encoder 200 includes the blocks of FIG. 1. In addition, the encoder includes a bit estimation block 202. The bit estimation block 202 estimates a bit size for an encoded version of the current CTU (i.e., an estimate of the bit size after entropy coding). In other words, the bit estimation block 202 generates an estimation by emulating the entropy encoding. Typically, the CTU comprises a specified block size and a specified coding schema (e.g., an inter prediction schema or an intra prediction schema). The estimate is based upon the specified block size and the specified coding schema. For each CU the estimated rate computed in blocks 102 and 104 is added to the rate estimate for the current CTU. Additional estimates for the bits required to encode other syntax elements, such as block mode and motion vectors may also be added to the rate estimates for the current CTU. Adding estimates for these other syntax elements is not crucial since a vast majority of bits are used for encoding transformed residuals when the bit count is close to the constraint on the number of bits. Block 202 is typically combined with block 106 into a single pipeline stage.

The encoder 200 also includes a CTU bit size limit manager 204. This block uses the bit size estimate from the bit estimation block 202 to select quantization parameters, which are passed to the quantization transform and reconstruct block 108. This block is typically combined with either block 106 or 108 into a single pipeline stage. The bit size estimate is compared with a threshold to determine whether it is likely that the CTU bit limit will be exceeded when encoding the CTU with the quantization parameters that were considered when computing the estimates. If the estimate exceeds the threshold, the quantization parameters are increased. The amount of the increase depends on the amount by which the estimate exceeds the threshold. Typically, with HEVC the bit count decreases by about 11% when increasing the quantization parameter by 1. The increase of the quantization parameter may thus be determined by the number of times 11% must be shaved off from the bit estimate until it becomes smaller than the threshold. While the HEVC specifies a limit equal to 5/3 of the uncompressed data, the threshold value may be set to a different value. For example, when encoding video in the 8-bit 4:2:0 format, the uncompressed size of a 64×64 CTU is 49,152 bits. The limit is thus 81920 bits. The threshold may be set to a lower value to account for estimation errors in the bit estimate. For example, if certain syntax elements are omitted from the estimate, the limit may be reduced by the worst case bit count that these syntax elements can incur.

Also, the bit estimate may be computed for only the luma component, thereby ignoring the chroma components. The threshold should thus be reduced by the estimated worst case bit cost for the chroma components. The threshold further needs to be adjusted to account for the estimation error. The bit estimate typically contains inaccuracies since it is impractical to account for all entropy coding nuances and states in context-adaptive binary arithmetic coding (CABAC). For example, the bit estimate may be set equal to the sum of $2*\log_2(x)+2$, where x is the absolute value of each estimated nonzero quantized coefficient. Such an estimate may be slightly larger than the actual bit count since it does not account for the adaptive binarization in CABAC. This adaptation tends to reduce the number of bits required to encode large coefficient values when they are many of them in a block.

While the main purpose is to make sure that the bit limit specified by the HEVC specification is not exceeded, the threshold can be further adjusted to not surpass a lower limit. The lower limit may, for example, be defined as the size of the uncompressed data, meaning no CTU should require more bits than its uncompressed representation, or one half of the size of the uncompressed data such as to achieve a minimum compression ratio of about 2:1.

The bit limit may also be set with respect to the capabilities of the entropy coding block 112. For example, if the entropy coding block 112 is capable of producing 8000 bits per CTU within the allocated 6400 clock cycles, the bit limit may be set to 8000.

The bit limit may also be set with respect to a target bit count allocated for a picture or a portion thereof. If N bits are allocated to a picture containing M CTUs, the bit limit may be set to k times N/M, where k is a value larger than 1, such as 8. This ensures that no CTU in the picture will produce a disproportionately high number of bits.

The bit limit may also be set by considering a combination of the examples above where the bit limit is the smallest value of the bit values considered above.

The encoder 200 also includes a refinement block 206. The refinement block 206 receives from the entropy coding block 112 the actual bit size for a CTU. It compares that to the estimate generated by the bit estimation block 202. It then determines whether refinement of the estimation parameters is required. If so, refined parameters are sent to the bit estimation block 202. Refinement parameters may include a scale and an offset. Similarly, the actual bit size for a CTU is used to determine whether an appropriate threshold is being used by the CTU bit size limit manager 204. If not, the refinement block 206 refines the threshold, which is then passed to the CTU bit size limit manager 204. When determining whether a refinement of the estimation parameters is required, the refinement block 206 may consider only those CTUs for which the actual bit size is close to the desired bit limit or the estimated bit count is close to the threshold. Alternatively only those CTUs for which the actual bit size exceeds the desired limit may be considered.

Thus, the invention provides a mechanism to avoid exceeding the CTU bit size limit. Advantageously, it operates without directly taking into account the output of the entropy coding stage 112. This avoids the delay of re-encoding CTUs, which might otherwise disrupt the encoding process.

The bit estimation block 202 estimates the number of bits it will take to encode a CTU with a given QP. For example, the estimate may be based upon the number non-zero coefficients and their magnitude to emulate the behavior of the entropy encoding engine. Alternately or in addition, the size of the residual at the output of the RDO process may be used.

The CTU bit size limit manager 204 determines if the estimated number of bits is larger than a defined threshold. If so, a signal is sent to the quantization transform and reconstruct block 108 to use a QP that will guarantee that the coded CTU will not exceed the CTU bit size limit. The CTU bit size limit manager 204 may specify the use of raw Pulse Code Modulation (PCM) data if it is a better approach than using quantization.

The threshold may be periodically adjusted to guarantee that there is a safe margin between the number of estimated bits and the CTU bit size limit.

Figure 3:
FIG. 3 illustrates processing operations associated with an embodiment of the invention.

FIG. 3 illustrates refinement block processing performed in accordance with an embodiment of the invention. A CTU bit estimate is compared to an actual CTU bit value 300. The CTU bit estimate is obtained from the bit estimation block 202, while the actual CTU bit value is received from the entropy coding block 112. Estimation parameters are optionally refined based upon the comparison 302. That is, estimation parameters are modified to more closely align CTU bit estimates to actual CTU bit values. Estimation parameters that may be altered in accordance with embodiments of the invention include the number of non-zero coefficients and their magnitude to emulate the behavior of the entropy encoding engine. Alternately or in addition, the size of the residual at the output of the RDO process may be used.

Finally, the CTU bit size threshold is optionally refined 304. That is, the threshold is optionally aligned to insure that there is a safe margin between the number of estimated bits and the CTU bit size limit. A safe margin is characterized as 85% of the limit, but it could be adjusted over time if the estimation and the actual number of bits converge to the same values.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A hardware encoder with pipeline stages for coding tree unit bit size limit management, comprising:
   a bit estimation block pipeline stage operating after a mode decision stage and before a quantization stage to compute an estimated bit size for a Coding Tree Unit (CTU) before the CTU is coded; and
   a CTU bit size limit manager pipeline stage to select quantization parameters for use in quantization, wherein the quantization parameters are selected based upon the estimated bit size to insure that the CTU in coded form will not exceed a CTU bit size limit.

2. The hardware encoder of claim 1 further comprising a refinement block connected to the bit estimation block pipeline stage, the CTU bit size limit manager pipeline stage and an entropy coding block to compare the estimated bit size to the actual bit size of the CTU in coded form to improve future accuracy of the bit estimation block pipeline stage based on data from an actual bit size for the CTU in coded form.

3. The hardware encoder of claim 2 wherein the refinement block alters parameters utilized by the bit estimation block pipeline stage.

4. The hardware encoder of claim 2 wherein the refinement block alters a threshold utilized by the CTU bit size limit manager pipeline stage.

5. The hardware encoder of claim 4 wherein the threshold is a margin between the estimated bit size and the CTU bit size limit.

6. The hardware encoder of claim 1 wherein the CTU bit size limit is the bit size of the uncompressed data corresponding to the CTU.

7. The hardware encoder of claim 1 wherein the CTU bit size limit manager pipeline stage selects quantization parameters based upon an amount by which an estimated CTU bit size exceeds a threshold.

8. The hardware encoder of claim 1 wherein the CTU bit size limit is based upon capabilities of an entropy coding block.

9. The hardware encoder of claim 1 wherein the CTU bit size limit is based upon a target bit count.

* * * * *